(Model.)
F. M. HUNT.
COTTON SEED PLANTER.
No. 245,171.   Patented Aug. 2, 1881.
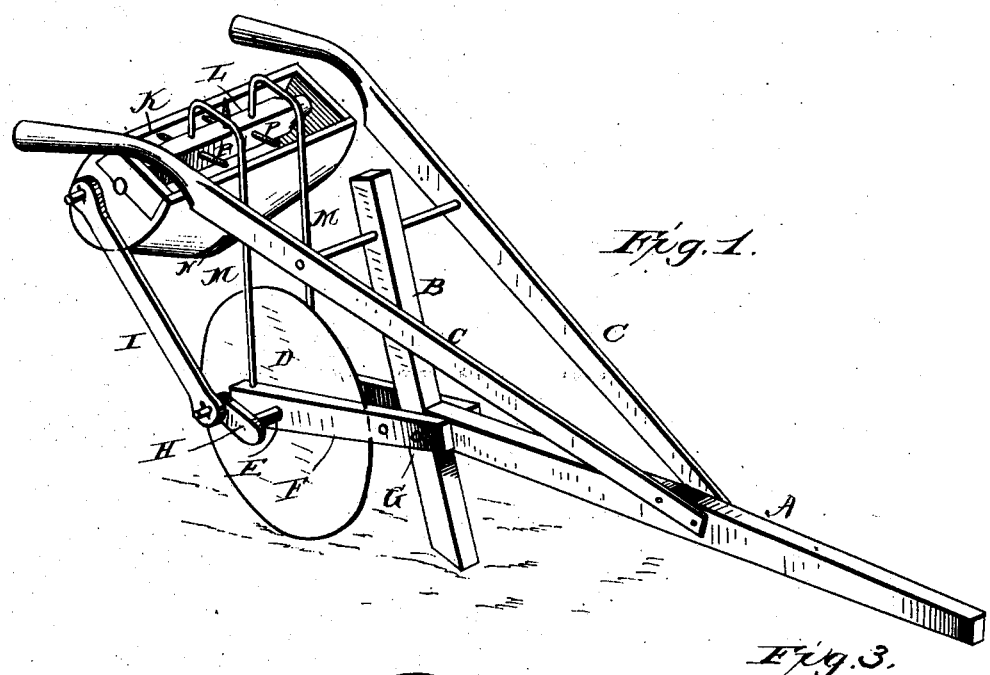
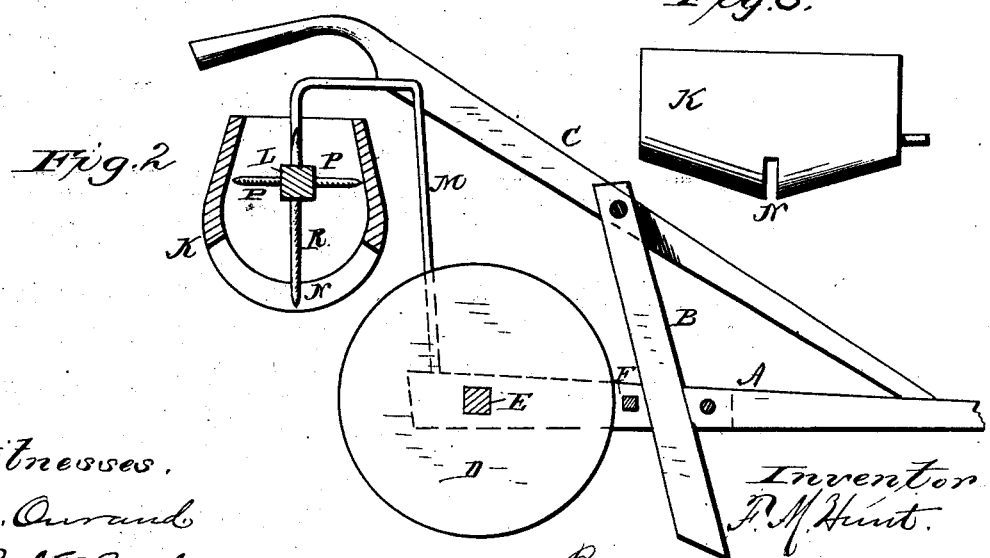
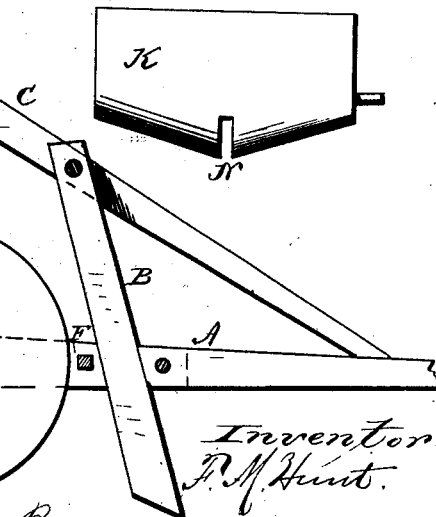
Witnesses.
F. L. Ourand
J. J. McCarthy
Inventor
F. M. Hunt
By Alexander & Mason
Attys

UNITED STATES PATENT OFFICE.

FRANK M. HUNT, OF ROUND OAK, GEORGIA.

COTTON-SEED PLANTER.

SPECIFICATION forming part of Letters Patent No. 245,171, dated August 2, 1881.

Application filed March 28, 1881. (Model.)

*To all whom it may concern:*

Be it known that I, FRANK M. HUNT, of Round Oak, in the county of Jones, and in the State of Georgia, have invented certain new and useful Improvements in Cotton-Seed Planters; and I do hereby declare that the following is a full, clear, and exact description thereof, reference being had to the accompanying drawings, and to the letters of reference marked thereon, making a part of this specification.

This invention relates to certain improvements in cotton-seed planters; and it has for its objects to provide an apparatus which may be constructed at comparatively little expense, and by means of which the cotton-seed may be regularly and reliably delivered. These objects I attain by the apparatus illustrated in the accompanying drawings, in which—

Figure 1 illustrates a perspective view of my improved seed-planter; Fig. 2, a longitudinal sectional view thereof, and Fig. 3 a detached view of the seed-distributing hopper.

The letter A indicates the draft-beam, B a standard attached to the rear of said beam, and C the handles, all of which are similar to those of an ordinary plow.

The letter D indicates a driving-wheel mounted on a shaft, E, journaled in a frame, F, loosely attached to the rear of the beam A at G. The shaft E is provided at one end with a crank, H, which connects by means of a link, I, with an oscillating distributing-hopper, K, which is mounted on the ends of a transverse bar, L, rigidly secured to the bent standards M secured to the rear of the frame F, the said hopper being capable of freely oscillating on said shaft. The hopper has its bottom inclining from each end toward the center, as clearly shown in Fig. 3, so as to naturally feed the seed to such point, and at the center is provided with a transverse slot, N, through which the seed are distributed.

The bar L is provided with a series of agitating-teeth, P, and with a distributing-tooth, R, which extends down into the slot N, so as to deliver the seed through said slot.

The operation of my invention is as follows: The hopper is filled with the seed, and the apparatus is drawn over the field in any convenient manner. The rotation of the driving-wheel causes the hopper to oscillate, and the teeth on the bar L feed and distribute the seed through the slot in the hopper.

I am aware that an oscillating hopper with an aperture in the bottom and provided with stirrers to discharge the seed is not new, and such I do not claim, broadly.

Having thus fully described my invention, what I claim, and desire to secure by Letters Patent, is—

The combination, in a seed-planter, of the draft-beam A, handles C, and standard B of the loosely-secured frame F, wheel D, crank H, and link I, and the standards M, shaft L and its stirrers, and the oscillating hopper mounted on said shaft, the whole arranged to operate substantially as specified.

In testimony that I claim the foregoing I have hereunto set my hand this 4th day of March, 1881.

F. M. HUNT.

Witnesses:
J. J. MCCARTHY,
J. W. CABANISS.